US012206358B2

(12) United States Patent
Schiffer et al.

(10) Patent No.: US 12,206,358 B2
(45) Date of Patent: Jan. 21, 2025

(54) SOLAR POWERED POOL HEATER

(71) Applicants: Yehuda Schiffer, Cedarhurst, NY (US); Michelle Anne D'Andrea, Amityville, NY (US)

(72) Inventors: Yehuda Schiffer, Cedarhurst, NY (US); Michelle Anne D'Andrea, Amityville, NY (US)

(*) Notice: Subject to any disclaimer, the term of this patent is extended or adjusted under 35 U.S.C. 154(b) by 554 days.

(21) Appl. No.: 17/496,819

(22) Filed: Oct. 8, 2021

(65) Prior Publication Data
US 2022/0115985 A1 Apr. 14, 2022

Related U.S. Application Data

(60) Provisional application No. 63/089,838, filed on Oct. 9, 2020.

(51) Int. Cl.
F24S 20/00 (2018.01)
E04H 4/12 (2006.01)
H02S 20/30 (2014.01)
H02S 40/44 (2014.01)

(52) U.S. Cl.
CPC ............. H02S 40/44 (2014.12); E04H 4/129 (2013.01); F24S 20/02 (2018.05); H02S 20/30 (2014.12)

(58) Field of Classification Search
CPC ......... H02S 40/44; H02S 20/30; E04H 4/129; F24S 10/742; F24S 20/02; F24S 10/72
See application file for complete search history.

(56) References Cited

U.S. PATENT DOCUMENTS

| | | | | | |
|---|---|---|---|---|---|
| 4,552,125 A | * | 11/1985 | Borodulin | ............... | F24S 20/50 126/711 |
| 5,429,270 A | * | 7/1995 | Tumminia | ............... | E03D 9/037 222/642 |
| 2009/0204263 A1 | * | 8/2009 | Love | ...................... | G05D 23/19 700/282 |
| 2012/0024372 A1 | * | 2/2012 | Delgado | ................. | H02S 40/44 126/646 |
| 2014/0041651 A1 | * | 2/2014 | Mireshghi | ............... | F24S 10/17 126/565 |
| 2015/0368921 A1 | * | 12/2015 | Dzindo | .................... | F24H 15/32 62/238.7 |
| 2016/0033173 A1 | * | 2/2016 | Rowshan | ................. | F24S 20/02 126/646 |
| 2017/0108233 A1 | * | 4/2017 | Howard | ................ | F24S 10/742 |
| 2021/0388627 A1 | * | 12/2021 | Brown | .................. | E04H 4/1281 |

* cited by examiner

Primary Examiner — Alfred Basichas
(74) Attorney, Agent, or Firm — William Collard

(57) ABSTRACT

A portable solar powered pool heater comprising a housing, a hose, a controller, a solar panel and at least one leg having a first position for supporting the housing above a surface, and a second position disposed inside of the housing. This heater can include a hinge, wherein the leg comprises a leg that is coupled to the housing via the hinge. In one embodiment the leg comprises a telescoping leg having a first leg, and a second leg wherein said second leg is telescoping inside of the first leg.

19 Claims, 7 Drawing Sheets

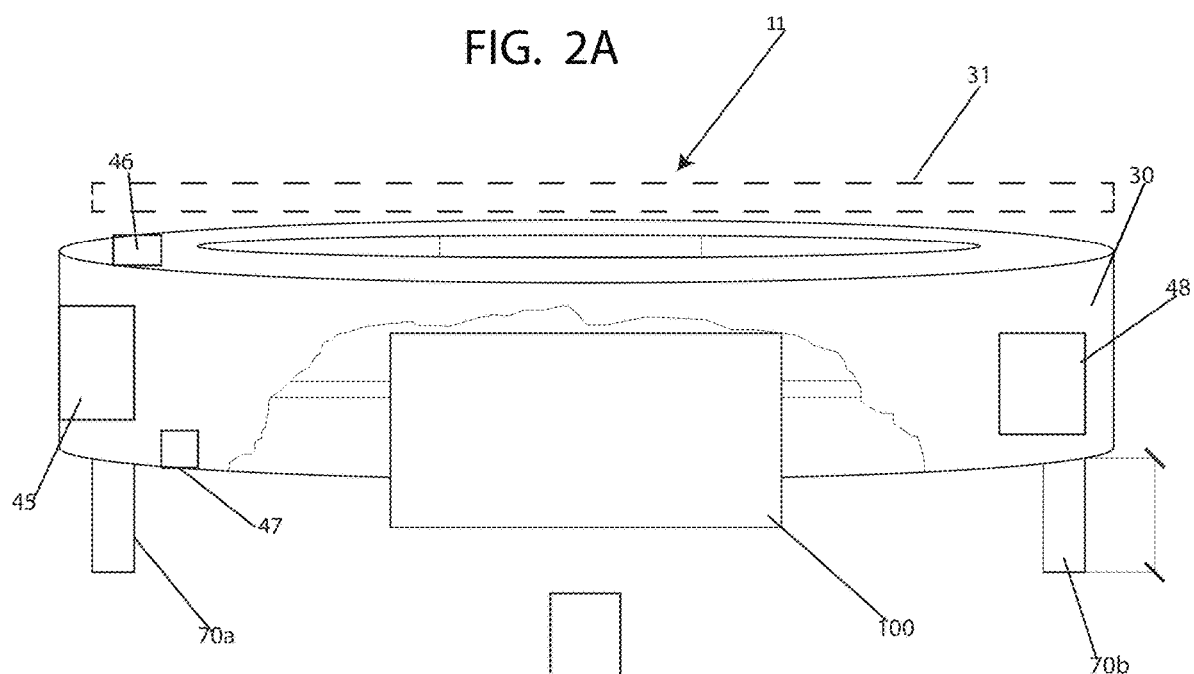
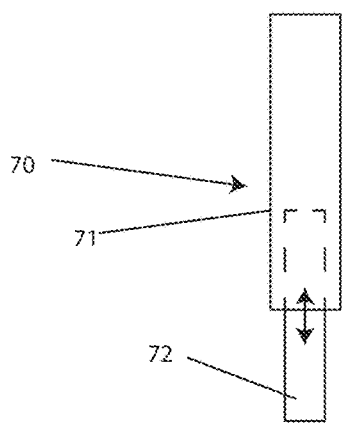

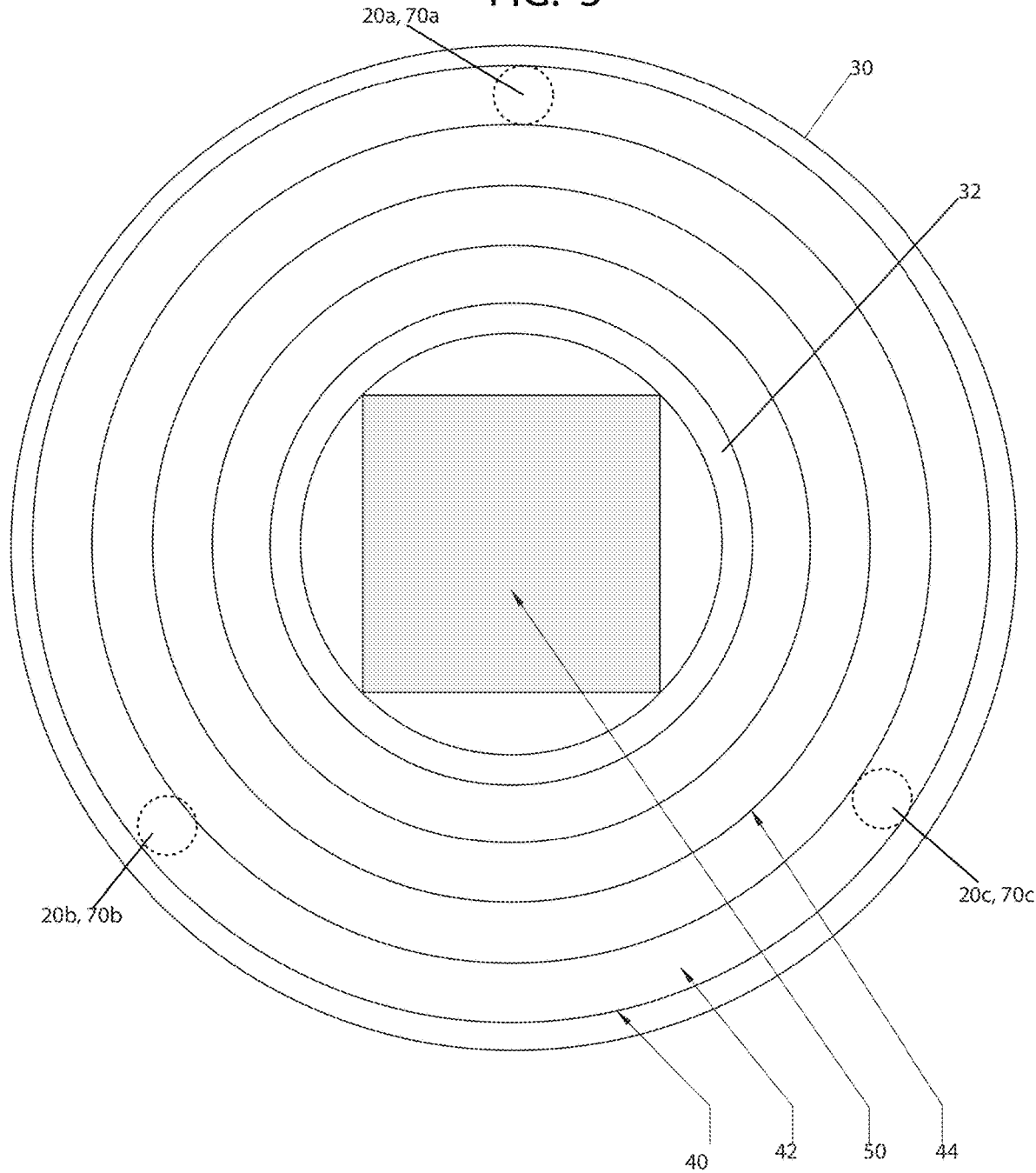

SOLAR POWERED POOL HEATER

CROSS REFERENCE TO RELATED APPLICATIONS

This application is a non-provisional application that claims priority to provisional application Ser. No. 63/089,838 filed on Oct. 9, 2020, the disclosure of which is hereby incorporated herein by reference in its entirety.

BACKGROUND OF THE INVENTION

At least one embodiment of the invention relates to a solar powered pool heater which comprises at least one hose, a solar panel, a controller, a valve, and a pump. In the past, solar powered pool heaters were expensive, complicated to set up and hard to maneuver. Therefore, there is a need for a solar powered pool heater which has a simple design, is easy to set up and also quite portable.

SUMMARY

At least one embodiment of the invention comprises a portable solar powered pool heater comprising a housing, a hose, a controller, a solar panel, and at least one leg having a first position for supporting the housing above a surface, and a second position disposed inside of the housing. This device can include a hinge, which is coupled at one end to the leg and at another end to the housing. With the leg being attached via a hinge, the leg can be folded up into the housing. In one embodiment, the leg comprises a telescoping leg having a first leg, and a second leg wherein said second leg is telescoping inside of said first leg.

In at least one embodiment, the hose is coiled inside of the housing. The coiled hose is configured to absorb the rays of the sun and to heat up the water disposed inside of the hose. The hose can be of a color such as black so that it absorbs the heat from the sun. In at least one embodiment, the hose has an input and an output, wherein the input is configured to take water into the hose and the output is configured to discharge water from the hose. In at least one embodiment, there is valve which is coupled along the hose. In at least one embodiment, the valve is coupled to the hose adjacent to the input on the hose. In at least one embodiment there is a pump. In at least one embodiment, there is a pump primer button in communication with the pump for priming the pump for pumping. In at least one embodiment, there is a battery for powering the components in the controller. The battery allows the device to be portable across a pool deck without having to plug the pool pump into an external electrical source.

In at least one embodiment, there is a thermostat coupled to the controller. In at least one embodiment, there is a thermostat input valve, wherein the thermostat input valve is configured to selectively open when the thermostat reaches a predetermined temperature. There can also be a timer coupled to the thermostat, wherein the timer is configured to selectively open or close the thermostat input valve based upon a predetermined set of time. In at least one embodiment, there is a WIFI transceiver configured to allow communication from the controller to another electronic device.

BRIEF DESCRIPTION OF THE DRAWINGS

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Figure 1A:
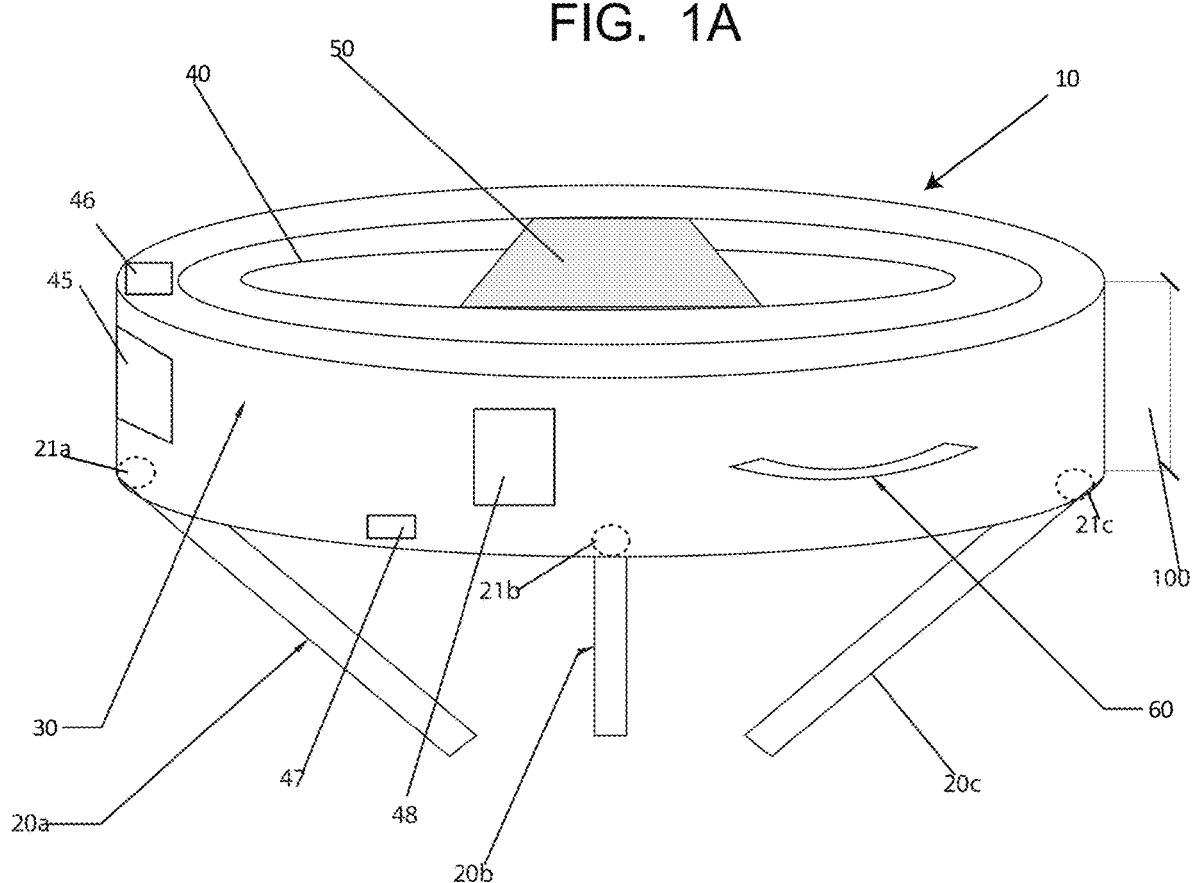

Unless otherwise specifically noted, articles depicted in the drawings are not necessarily drawn to scale.

Figure 1B:
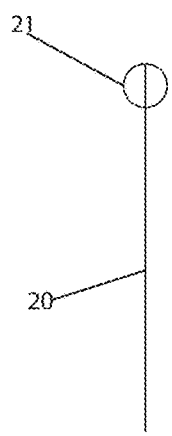
Figure 4:
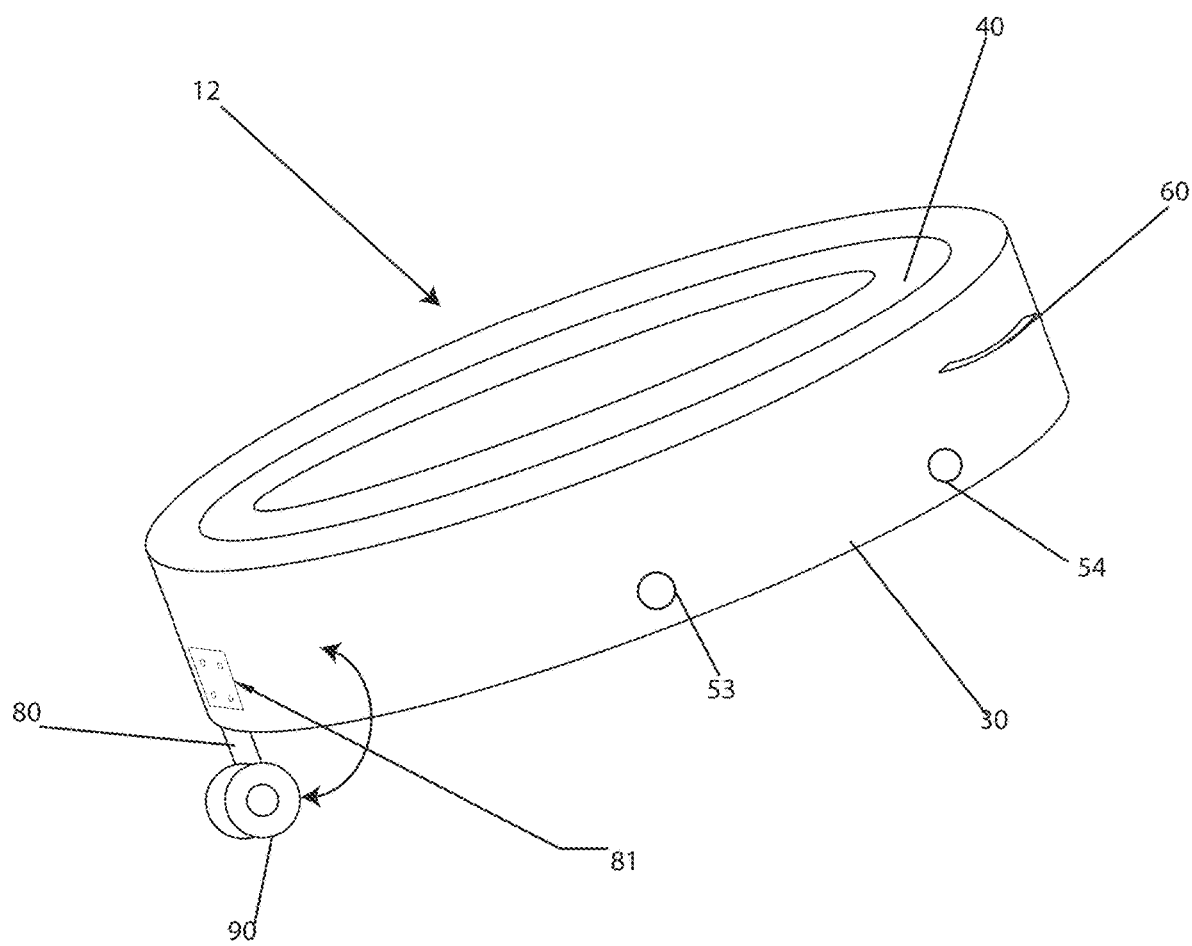
Figure 5:
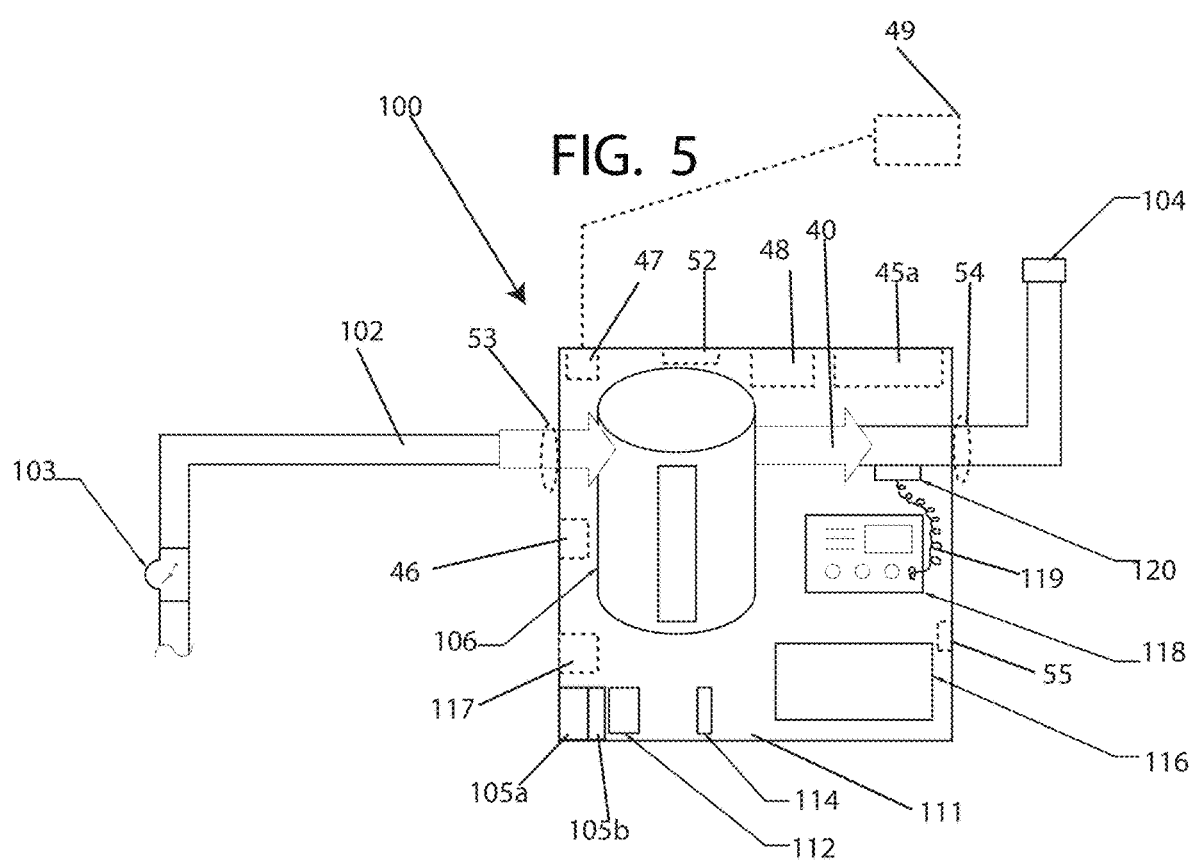
Figure 6:
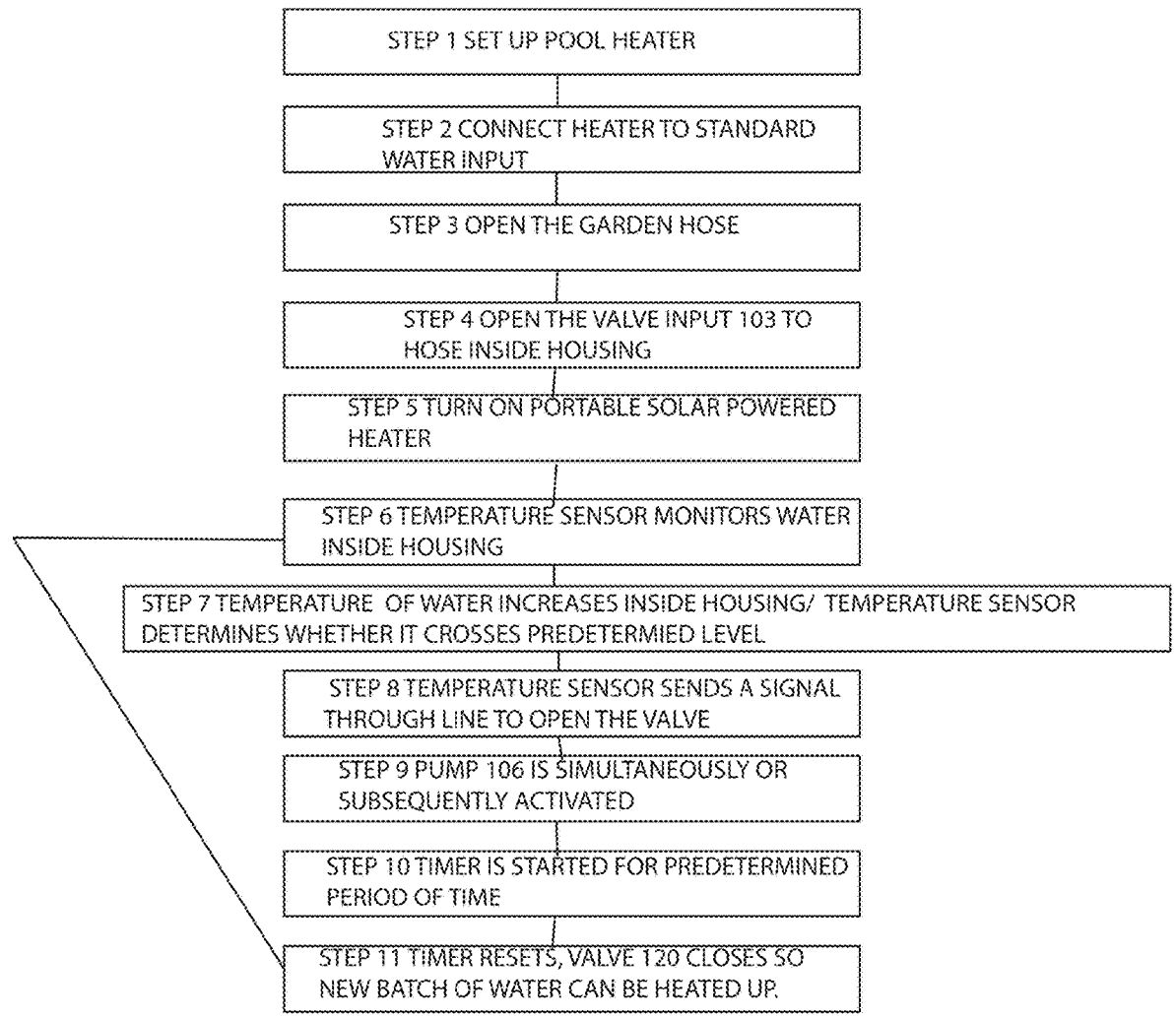

FIG. 1A is a perspective view of a first embodiment of the invention;

FIG. 1B is a side view of at least one leg;

FIG. 2A is a side view of a second embodiment;

FIG. 2B is a side view of a second embodiment of a leg;

FIG. 3 is a top view of one of the embodiments;

FIG. 4 is a side view of another embodiment of the invention;

FIG. 5 is a schematic block diagram of a controller;

FIG. 6 is a flow chart for operating the device; and

Figure 7:
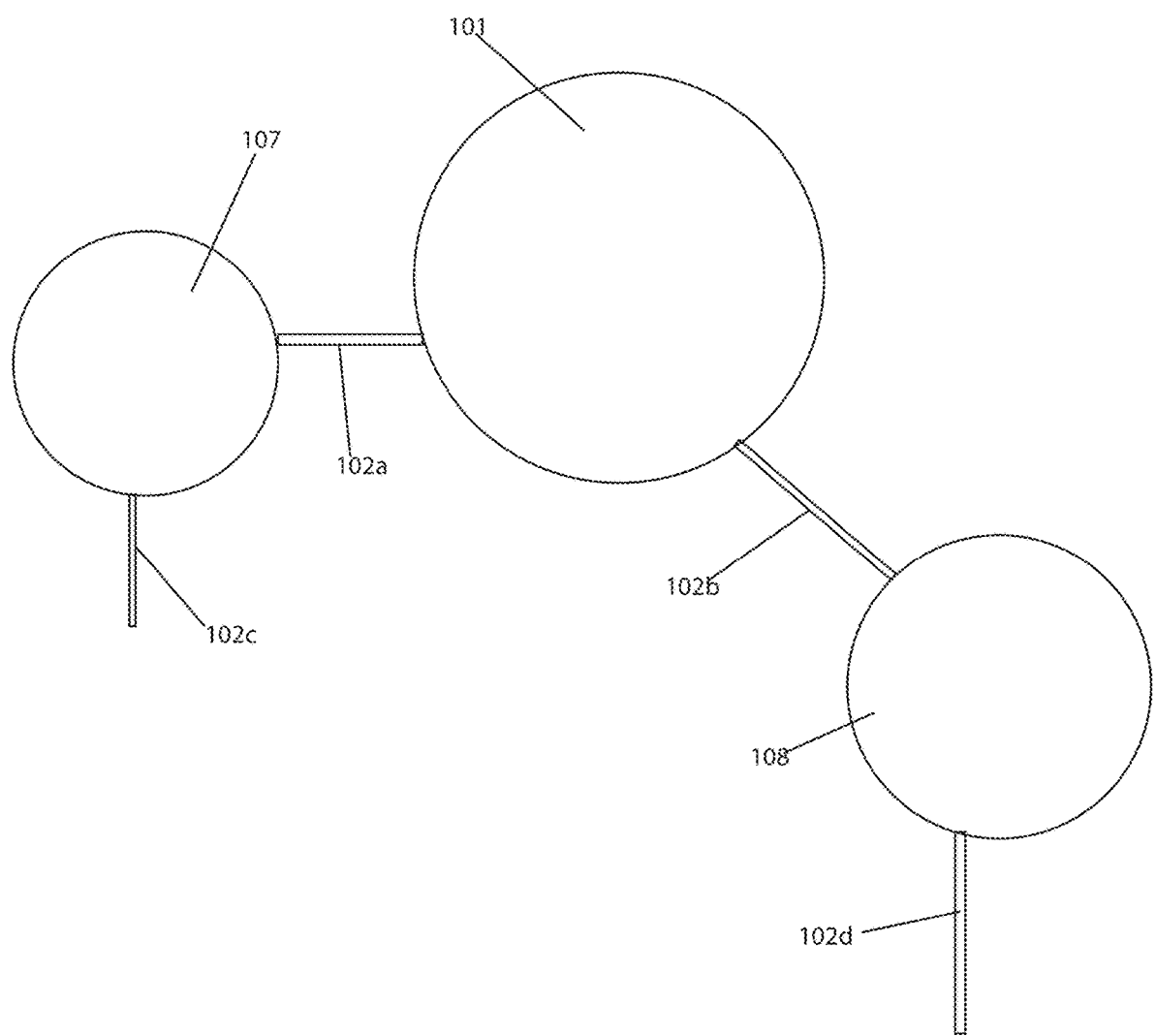

FIG. 7 is a plan view of another embodiment of multiple pool heaters connected in series.

DETAILED DESCRIPTION

Turning now in detail to the drawings, FIG. 1A is a perspective view of a first embodiment of the device 10 of the invention which includes a housing 30 having a plurality of legs 20 comprising a first leg 20a, having a hinge 21a, a second leg 20b having a hinge 21b, and a third leg 20c having a third hinge 21c. Each of these hinges 21a, 21b and 21c are coupled to the housing 30 which is in the form of a container. The container can be in the form of a wicker decorative housing which can be used to be in the form of furniture by a pool side. While three legs are shown additional legs can be used as well such as a fourth leg or more.

Disposed inside of housing 30 is a hose 40 which can be in the form of a dark colored hose which is configured to absorb the heat from the sun so that the water inside of the hose 40 can then heat up. There is also a solar panel 50 which is disposed in a central region of the housing 30, and inside of the coiled hose 40. Coupled to the side of the housing 30 is a handle 60 and a controller 100 (See FIG. 2A). Controller 100 is configured to be disposed inside of housing 30. Alternatively, in at least one embodiment, the controller 100 can be positioned outside of the housing 30. With at least one embodiment, there is a door for allowing an additional battery door 45 which is configured to open to allow additional auxiliary batteries to be inserted therein. Thus, with this design, multiple batteries can be used wherein while one is being used another battery can be separately charged and then re-inserted into the housing 30.

There is also an indicator 46 which is configured to indicate the temperature of the water inside of the hose 40 inside of the housing 30. The indicator is positioned on the top surface of the housing so that a user can look down towards this surface and then see what the temperature of the water inside of the hose is inside of the housing 30. Furthermore, there is also a USB or other style port 47 which is configured to allow a user to insert and connect via both power and communication to the internal circuit board 100 (See FIG. 5).

An optional speaker 48 can be coupled to the housing 30. Speaker 48 includes an amplifier so that when a portable music player such as a portable cellular telephone is coupled to the housing 30 via USB or other style port 47 the music from the music player can be projected from the speaker 48.

In addition, the battery door 45, the indicator 46, the USB connection port 47 and the speaker 48 are also shown in FIG. 2A as well.

FIG. 1B is a side view of at least one leg 20. This leg 20 is connected at one end by a hinge 21 to housing 30. In addition, other types of legs can be used as well.

For example, FIG. 2A is a side view of a second embodiment. With this view there is a housing 30 which has a controller 100 coupled to it. Legs 70*a* and 70*b* are coupled to housing 30. These legs 70*a* and 70*b* are telescoping legs. FIG. 2B shows a side view of a telescoping leg. This leg 70 includes an outer leg 71 and an inner leg 72.

This inner leg is slidable inside of outer leg 71. Thus, with this design, the housing, including the legs is collapsible with telescoping legs sliding inside of each other so that these legs can be stored inside of the housing. In addition, in this embodiment as well as in other embodiments a table top 31 can be used and placed over the housing such as housing 30. This table top 31 can be a sheet of transparent/translucent material such as glass or plastic which is configured to fit over the housing while still allowing the radiation from the sun to go therethrough and on to the hose disposed inside of the housing. Table top 31 can be a shaped to match the shape of the housing from the plan or top down view. Thus, table top 31 serves as a transparent covering over housing 30.

FIG. 3 is a top view of the portable solar powered pool heater 100. For example, this design includes a hose 40 having a plurality of loops 42, 44 which are wrapped around a solar panel 50. There is also an outer housing 30 and an inner housing 32 which takes the inner loop of the hose 40. The solar panel 50 is positioned inside of inner housing 32 There are three legs 20*a*, or 70*a*, 20*b*, or 70*b*, and 20*c* or 70*c* positioned equidistant around the housing 30. Because each of these legs 20 or 70 are collapsible (foldable or telescoping) inside the housing 30 it allows the legs to be collapsed inside of the housing 30 so that the device 10 is portable.

FIG. 4 is a side view of another embodiment of the invention 12, which shows an outer housing having a handle 60. Coupled to the housing 30 is a leg 80. Coupled to the leg 80 are a plurality of wheels 90. Wheels 90 are configured to allow the device to be rolled along a surface such as a pool surface. Leg 80 is coupled to a hinge 81 which includes a lock for locking this leg 80 in place or in a folded-up position inside of housing 30. FIG. 4 also shows a plurality of quick connect ports 53 and 54 which are used to provide quick connections to hoses. For example, port 53 serves as an input port, while port 54 serves as an outflow port (See also FIG. 5).

FIG. 5 is a schematic block diagram of a controller.100 which is connected to a plurality of hoses. Controller 100 includes a motherboard 111 having a microprocessor 105*a* and a memory 105*b* installed on it. Microprocessor 105*a* is configured to perform the steps of FIG. 6, while memory 105*b* stores the values that can be set such as for timing and temperature of the water to be stored in hose 40. In addition, there is a hose 102 having a valve 103. This hose 102 can be coupled to a home garden hose and forms an input into a pump 106. Hose 102 is coupled to hose 40 inside of housing 30. There is a motherboard 111 which has an on/off switch 112, and a pump primer 114. There is also a battery 116 which is coupled to the motherboard 111. The battery 116 is configured to receive power from the solar panels 50 so that the solar panels charge the battery 116. Coupled to the circuit board 111 is a temperature sensor/timer 118. Temperature sensor/timer 118 is configured to selectively open an associated valve 120 when a temperature inside of the hose 40 reaches a pre-determined point. Once the temperature of the water inside of the hose 40 is sufficiently high, the temperature sensor 118 is configured to open a valve 120 to release the water inside of hose 40. The water then flows outside of hose 40 through opening in outflow hose 104 and into the pool. The amount of water that flows through hose 40 is controlled by the amount of time pre-set by the temperature sensor/timer 118. Thus, if the pre-set amount of time is 15 seconds, once the temperature is reached, it then opens valve 120 so that heated water would flow out of hose 40 for 15 seconds, which would approximately correspond to the amount of time it would take to drain hose 40 of heated water when it flows into an adjacent pool. In at least one embodiment, the valve 120 is located adjacent to the outflow port 54 on the housing.

In addition, in this view there is also a quick connect port 53 which is configured to connect to input hose 102. There is also quick connect port 54 which is configured to connect to an outflow hose 104. In addition, there is also shown an additional battery 45*a* which can be inserted through battery door 45 (See FIG. 1A) and which can work in tandem with battery 116. This battery 45*a* can be modular can inserted or removed in a quick connecting manner. An indicator 46 which is positioned on the motherboard 111 is visible on a top surface of the housing. The indicator indicates the temperature of the water inside of the hose 40 (See FIG. 1A) within the housing 30.

A USB or electrical port 47 is shown coupled to the motherboard 111 wherein this USB port can be for charging external devices such as portable phones or other type devices. One type of external device that can be connected to a USB type port 47 is an external water temperature sensor 49, which can communicate with the motherboard 111 the temperature inside of a pool. A speaker 48 is also shown coupled to motherboard 111 wherein this speaker 48 is configured to include an amplifier and then project sound such as music from the housing such as housing 30. Any device that is connected to USB port 47 or which is in communication with a transceiver 52 can then project music or other sound through the motherboard 111 and be in communication with speakers 48. The transceiver 52 is configured to be a wireless transceiver which can communicate via WIFI, Bluetooth or any other suitable wireless protocol. There can also be an optional plug 55 for plugging into an outlet of power such as a wall AC power unit to charge or power the motherboard 111. When the device is optionally connected to power, it can be used to re-charge the battery 116 as well as battery 45*a*. Alternatively, battery 116 and battery 45*a* can be removed from motherboard 111 and separately charged. Basically, the pump 106 and the valve 120 work together to fill up hose 40 so that it can remain filled with water that is then heated from the sun when the heater is left on a pool deck or other location adjacent to a pool. Once valve 120 is opened water can be drained from the hose 40 and new water can be inserted therein via pump 106. Because the pump has a timer that is set to import a sufficient amount of new water into hose 40, it then shuts down after a pre-determined period of time that is deemed sufficient to fill up hose 40 again inside the housing 30.

FIG. 6 is a flow chart for the process for heating the water using the portable solar powered heater. For example, in step 1 the process starts with setting up the portable solar powered heater near the pool. Next, in step 2 the input and output ports 53 and 54 are connected via hoses to the heater. Next, in step 3, the input and output hoses such as hoses 102 and 104 are inserted into the pool. Next, in step 4 the portable solar powered heater can be turned on. Next in step 5, the pump 114 is primed wherein the portable solar powered heater to opened and fill the internal hose. The priming of the pump can be through the user pressing a button or remotely activating the pump such as through a remote controller such as a portable smart phone. Because the valve 120 is biased closed, the water simply fills the hose line such as hose line 40 first. Next, in step 6, temperature sensor/timer 118 monitors the temperature of the water inside of the housing 30/ hose. Next, in step 7, when the temperature of the water increases above a predetermined temperature, this then leads to the temperature sensor/timer 118 determining whether to distribute the water inside of the hose such as hose 40. If timer 118 determines whether to distribute water inside of the hose, then in step 8 it sends a signal through line 119 to valve 120 to open valve 120. In addition, in step 9, pump 106 is simultaneously or subsequently activated. Next, in step 10 a timer in timer 118 is started for a predetermined period of time. The predetermined period of time is set in timer 118 so that based upon the flow rate of water, the water is drained from the hose inside of housing 30 and a new dose of water flows within the hose. Next, in step 11 timer 118 resets, valve 120 is closed so that the new batch of water can then be heated up. Thus, the process restarts again wherein it goes back to at least step 6 wherein the temperature sensor monitors the water inside of the housing to determine whether it hits a predetermined temperature necessary for a release of the next batch of water. While timer and temperature sensor 118 is configured to have its own processing and memory, microprocessor 105a and memory 105b are optional and can also be used to store values memory 105b, or control the operation of the device through microprocessor 105a.

FIG. 7 is a plan view of multiple pool heaters comprising pool heater 101 coupled in series with pool heater 107 and pool heater 108. Each of these pool heaters are coupled in series via lines 102a and 102b (hoses) which transmit water between the water heaters. In this way multiple water heaters can be coupled together in series to continuously heat up the water. Water heaters 107 and 108 have additional hoses 102c and 102d wherein hose 102c functions as an intake hose, while hose 102d functions as an outflow hose. Thus water flows in through intake hose 102c into heater 107 where the water is heated at a first stage and then passed through hose 102a to heater 101, where the water is heated at a second stage. Next the water is passed through hose 102b on to heater 108 in a third stage wherein the heated water is then passed into an outflow hose 102d and into a pool. With this design, if an initial heater 101 is not sufficiently powerful, additional heaters can be connected in series so as to add additional heating power to the system.

Thus, with this design, there is formed a portable solar powered pool heater which can be either carried or rolled across a pool deck. The legs can be stored inside of the housing so that the portable solar powered pool heater can be stored easily or moved easily when not in use. In addition, a top can be placed on the portable solar powered pool heater. The top can be in the form of a glass top which allows the sun to shine through the top to the hose so that the hose can still absorb the heat from the sun while still allowing food or drinks to be placed on the surface. Thus, this portable solar powered pool heater is configured to also serve as pool side furniture as well.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

Although specific advantages have been enumerated above, various embodiments may include some, none, or all of the enumerated advantages.

What is claimed is:

1. A portable solar powered pool heater comprising:
a housing;
a hose;
a controller;
a solar panel; and
at least one leg configured to be movable from a first position for supporting the housing above a surface, and a second position disposed inside of the housing wherein the portable solar powered pool heater is formed as a table;
a controller disposed in the housing, said controller having a timer;
a pump disposed in the housing, wherein the controller controls the pump, and wherein the timer sets the time for pumping, so that the pump operates only so long as to pump heated water from said hose disposed inside of said housing.

2. The portable solar powered pool heater as in claim 1, further comprising a hinge, wherein said at least one leg comprises a leg that is coupled to said housing via said hinge.

3. The portable solar powered pool heater as in claim 1, wherein said leg comprises a telescoping leg having a first leg, and a second leg wherein said second leg is telescoping inside of said first leg.

4. The portable solar powered pool heater as in claim 1, wherein said hose is coiled inside of said housing.

5. The portable solar powered pool heater as in claim 4, wherein said hose has an input and an output, wherein said input is configured to take water into the hose and said output is configured to discharge water from the hose.

6. The portable solar powered pool heater as in claim 5, further comprising at least one valve.

7. The portable solar powered pool heater as in claim 6, wherein said at least one valve is coupled to the hose adjacent to the input on the hose.

8. The portable solar powered pool heater as in claim 1, further comprising a pump primer button in communication with the pump for priming the pump for pumping.

9. The portable solar powered pool heater as in claim 8 further comprising a battery.

10. The portable solar powered pool heater as in claim 9, further comprising a thermostat.

11. The portable solar powered pool heater as in claim 10, further comprising a thermostat input valve, wherein said thermostat input valve is configured to selectively open when the thermostat reaches a predetermined temperature.

12. The portable solar powered pool heater as in claim 11, further comprising a timer coupled to the thermostat, wherein the timer is configured to selectively open or close the thermostat input valve based upon a predetermined set of time.

13. The portable solar powered pool heater as in claim 1, further comprising a WIFI transceiver configured to allow communication from the controller to another electronic device.

14. A portable solar powered pool heater comprising:
a housing;
a hose;
a controller;
a solar panel; and
at least one leg having a first position for supporting the housing above a surface, and a second position disposed inside of the housing;
at least one set of wheels coupled to the housing for allowing the housing to be rolled across a surface;
a controller disposed inside of the housing;
at least one temperature sensor disposed inside of the housing;
at least one temperature sensor disposed outside of the housing, wherein the controller is configured to read a temperature of water disposed inside of the housing, and a temperature of water disposed outside of the housing.

15. The portable solar powered pool heater as in claim 14, further comprising at least one USB port for allowing an external device to be connected thereto.

16. The portable solar powered pool heater as in claim 15, further comprising at least one speaker coupled to the housing.

17. The portable solar powered pool heater as in claim 16, further comprising at least one battery door which is coupled to the housing, wherein the battery door is configured to selectively open to allow for the insertion of a battery into the housing.

18. The portable solar powered pool heater as in claim 15, further comprising at least one external temperature sensor, said external temperature sensor being configured to be coupled to the housing and also be configured to be placed inside of a pool.

19. The portable solar powered pool heater as in claim 14, further comprising at least one indicator, said indicator being coupled to the housing and being configured to indicate the temperature of the water disposed inside of the housing.

* * * * *